C. E. DILLINGER.
PIPE CUTTER.
APPLICATION FILED FEB. 7, 1916.
1,206,311.
Patented Nov. 28, 1916.
2 SHEETS—SHEET 1.
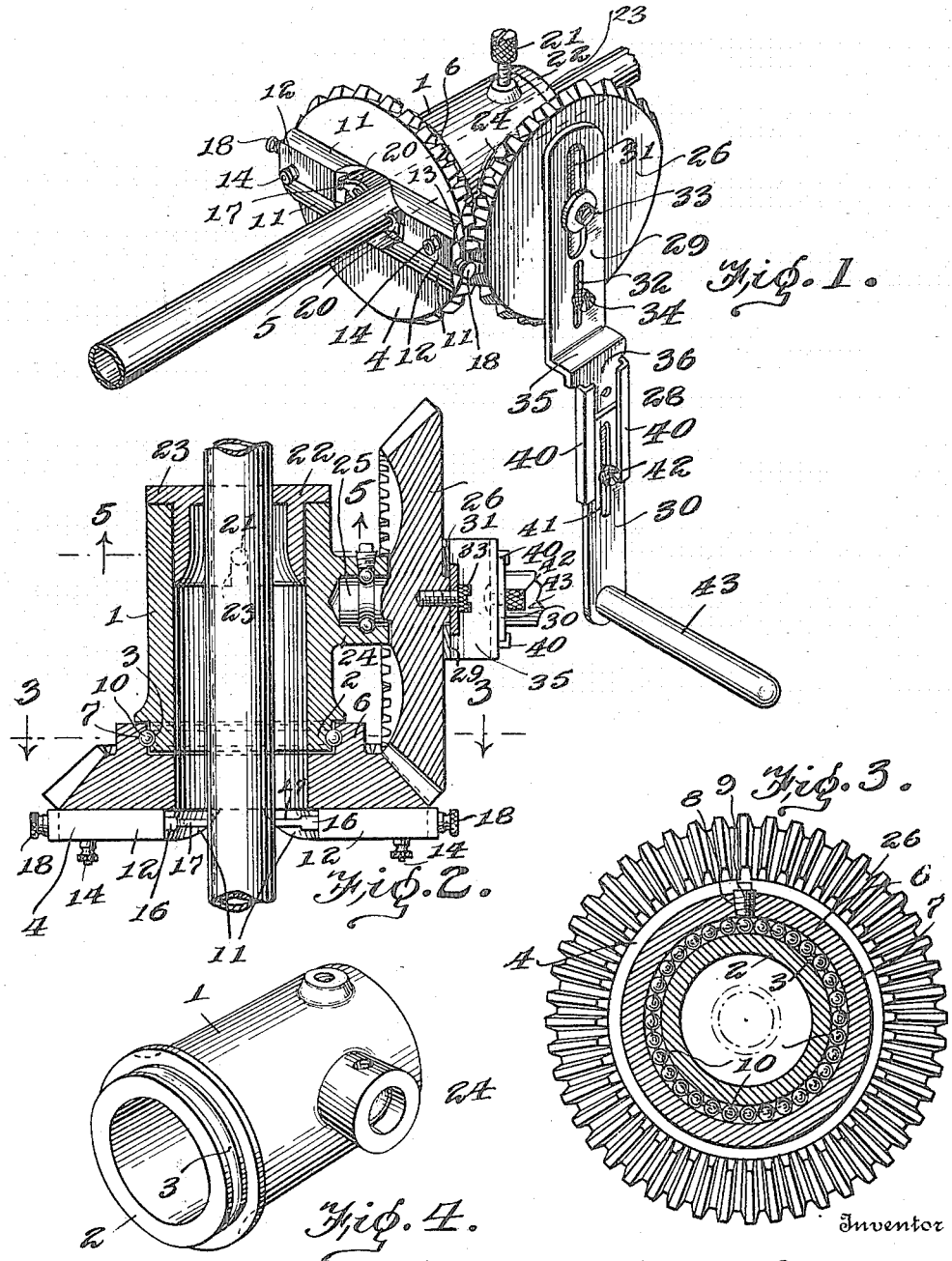
Witnesses
N. H. Lybrand
Wm. J. Forth
Inventor
Charles E. Dillinger,
By Victor J. Evans
Attorney

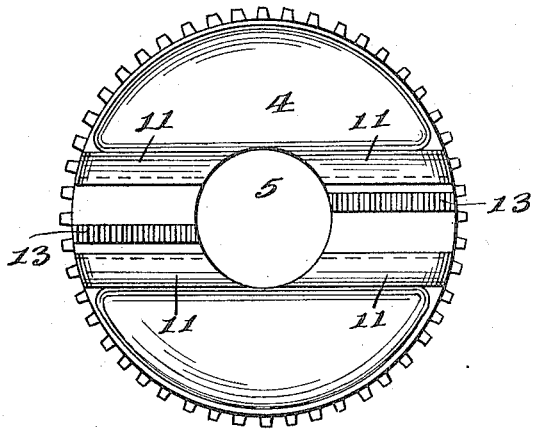
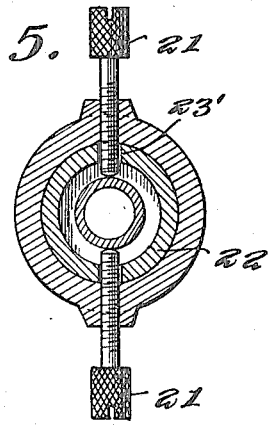
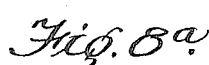
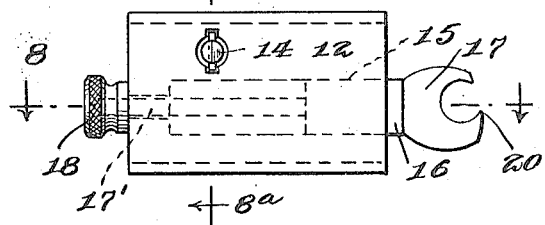
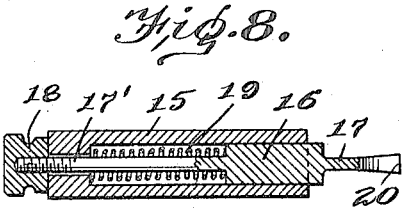
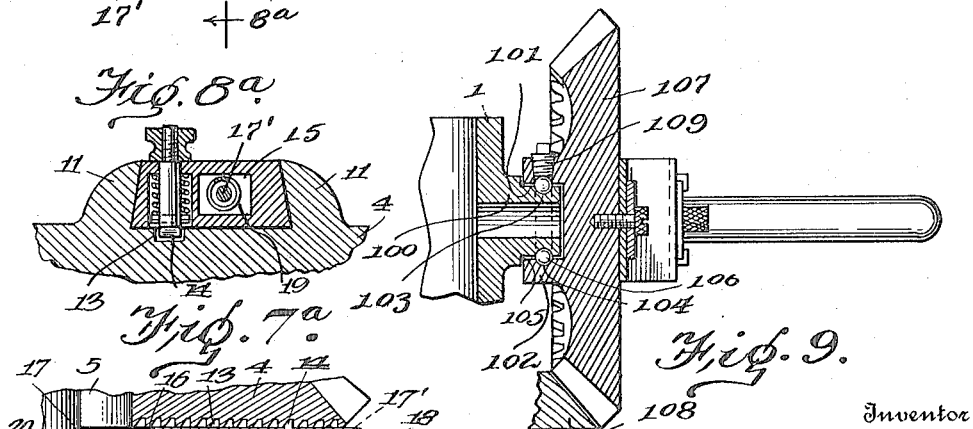

UNITED STATES PATENT OFFICE.

CHARLES E. DILLINGER, OF ORCUTT, CALIFORNIA.

PIPE-CUTTER.

1,206,311. Specification of Letters Patent. Patented Nov. 28, 1916.

Application filed February 7, 1916. Serial No. 76,741.

*To all whom it may concern:*

Be it known that I, CHARLES E. DILLINGER, a citizen of the United States, residing at Orcutt, in the county of Santa Barbara and State of California, have invented new and useful Improvements in Pipe-Cutters, of which the following is a specification.

This invention relates to improvements in machines for cutting pipes, an object being to simplify and improve the existing art by producing a machine for this purpose which will perform the functions for which it is adapted with ease and certainty.

A further object of the invention is to produce a machine of this class wherein the cutter will be automatically fed to the pipe.

A further object of the invention is to construct a pipe cutting machine including a body portion in the nature of a sleeve, to associate in a novel manner with the sleeve a rotary head carrying the cutter members, and to journal upon the sleeve a rotary member which co-acts with the head to provide the last mentioned member with a handle whereby when the same is revolved the head will be likewise rotated.

A still further object of the invention is to provide a machine of this class with a longitudinally adjustable handle, whereby the proper leverage may be obtained for the size of the pipe engaged by the cutter and also associated with the body of the cutter, a rotary head carrying the cutting members, the body being formed with a male extension having an annular semi-cylindrical depression, the head being provided with a female member having an annular depression which is adapted to register with the depression in the male member when the male member is inserted in the female member, the alining depressions forming a raceway for anti-frictional balls, and the said balls forming means for connecting the head with the body.

With the above and other objects in view, the improvement resides in the construction, combination and arrangement of parts set forth in the following specification and falling within the scope of the appended claim.

In the drawings: Figure 1 is a perspective view of a machine constructed in accordance with the present invention, Fig. 2 is a central longitudinal sectional view through the same, Fig. 3 is a section approximately on the line 3—3 of Fig. 2, Fig. 4 is a perspective view looking toward the inner end of the body or sleeve, Fig. 5 is a transverse sectional view of the sleeve member taken approximately on the line 5—5 of Fig. 2, Fig. 6 is a face view of the head, with the chuck and cutter removed, Fig. 7 is a view looking toward the inner face of one of the chuck members, Fig. 7$^a$ is a longitudinal sectional view approximately on the line 7$^a$—7$^a$ of Fig. 1, Fig. 8 is a longitudinal sectional view on the line 8—8 of Fig. 7, Fig. 8$^a$ is a transverse sectional view approximately on the line 8$^a$—8$^a$ of Fig. 7, Fig. 9 is a detail longitudinal sectional view illustrating a slight modification.

Referring now to the drawings in detail, the numeral 1 designates the body of my improvement which is in the nature of a barrel or sleeve. The sleeve 1, adjacent one of its ends is formed with an annular flange 2 providing the said end with what I will term a male extension, the same having an annular approximately semi-cylindrical depression 3. The numeral 4 designates the rotary head of the device. The head 4 is in the nature of a beveled toothed wheel and is provided with a central annular opening 5 which is of the same diameter as that of the bore of the sleeve 1. The head 4 upon what I will term its inner face is provided with a ring member 6 which upon its inner face is formed with an approximately semi-cylindrical depression 7 that is adapted to register with the depression 3 in the end of the sleeve. The ring member 6 has an opening 8 which communicates with its depression 7 and which is normally closed by a removable pin or stud 9 which retains anti-frictional balls 10 in the annular depressions 3 and 7.

The head 4 upon its outer face is provided with longitudinally extending spaced guides 11—11 which communicate with the central opening 5 in the head. The inner walls of the oppositely disposed guides are preferably beveled to engage with the beveled sides of chuck members 12. The head 4, between the guides 11, is provided with longitudinally extending rack teeth 13, and each of the chuck members 12 is provided with a spring pressed pawl 14 which is adapted to engage with the teeth of the respective racks.

Each of the chuck members 12 is formed with a longitudinally extending bore 15, preferably of a rectangular formation for a portion of the shank and for the remainder of its length rounded, the rectangular portion receiving a rectangular end or body portion 16 of a cutter member 17, and the rounded portion of the bore receiving the rounded stem 17' which is extended centrally from the body 16. The stem has its outer end threaded and is engaged by a nut 18 which also contacts with the outer end of the chuck. Arranged upon the stem 17 and contacting with the shoulder provided between the said stem and the substantially rectangular body 16 is a helical spring 19 which also contacts with the shoulder provided between the squared and rounded portion of the bore and which exerts a tension to force the knife edges 20 of the cutter toward the center of the opening 5 in the head, and the pressure of the cutter in this direction is limited by the nuts 18.

The sleeve is provided adjacent its free end with oppositely disposed adjustable binding screws 21 which are adapted to contact with the pipe when the same is arranged in the sleeve and in a position to be operated on by the cutters. The outer end of the sleeve is also provided with a reducing thimble 22, and any number of said thimbles to accord with the various sizes of pipes operated on by the cutter may be employed. Each of the thimbles has its outer face provided with a flange 23 which contacts with the end of the sleeve 1 and the body of each of the thimbles is provided with slots 23' through which the members 21 pass. The openings in the flanges 23 of each of the thimbles, as stated, vary to accommodate the different sized pipes.

Formed with and extending laterally from the sleeve 1 is a hollow boss 24 which is adapted to receive the stub shaft 25 provided upon a rotary member 26 which is in the nature of a beveled tooth wheel and which has its tooth co-engaging with the beveled tooth wheel rotary head 4. The stub shaft 25 is preferably provided with an annular depression which may register with a similar depression in the bore of the boss and received in these depressions are anti-frictional balls 26.

The numeral 28 designates the handle for the device. This handle comprises an inner section 29 and an outer section 30. The section 29 has its end provided with spaced slots 31 and 32 through which pass headed elements 33 and 34 that enter the outer face of the rotary member 26. The member 29 is provided with an offset portion 35 and is from thence extended in a plane longitudinal with the portion 29, as indicated by the numeral 36. The portion 36 has its ends bent to provide ways 40 for the extension 30, and the said extension 30 is provided with a slot 41 through which passes a headed element 42 that is engaged by the portion 30 of the element 29. The outer end of the member 30 is provided with an offset handle 43, and by a construction as just described it will be noted that the handle may be lengthened or shortened to agree with the class of work being operated.

In Fig. 9 the body or sleeve 1 is illustrated as being integrally formed with a centrally arranged right-angularly disposed tubular extension 100, the same having its end reduced, as at 101, providing a shoulder 102. The reduced portion 101 is provided with an annular depression forming a raceway 103 which is adapted to register with a similar depression 104 provided upon a sleeve 105 that is fitted over and adapted to revolve upon the reduced portion 101 of the member 100.

The numerals 106 designate antifrictional members which are arranged in the registering depressions 103 and 104, and the end of the sleeve 105 may contact with the shoulder 102. The sleeve is centrally formed upon the beveled tooth wheel 107, similar to the beveled tooth wheel 26 previously described and which meshes with the beveled teeth on the head 108, which is similar to the head 4. The sleeve 105 is provided with an aperture which communicates with its depression 104, the said aperture being normally closed by a suitable block 109, and whereby the anti-frictional members 106 may be admitted to the raceway to hold the sleeve 105 upon the member 100 of the tubular sleeve or body of the device.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

In a pipe cutter, a body comprising a sleeve, a head comprising a beveled toothed wheel secured for rotation upon the sleeve, said head having a central opening communicating with the sleeve, longitudinally extending guides arranged in pairs upon the head, toothed racks between the guides, a chuck for each of the guides, a spring pressed pawl carried by each of the chucks and engaging between the teeth of the rack bars, spring pressed cutter members carried by the chucks, means for adjusting the said members, a beveled toothed wheel journaled angularly of the sleeve and co-acting with the teeth of the rotary head, and an adjustable handle for the said beveled toothed wheel.

In testimony whereof I affix my signature in presence of two witnesses.

CHARLES E. DILLINGER.

Witnesses:
F. L. SIEGFRIED,
ED. STULL.

Copies of this patent may be obtained for five cents each, by addressing the "Commissioner of Patents, Washington, D. C."